Oct. 26, 1965 L. V. FORGUES 3,213,687
FLUID METER
Filed Oct. 15, 1962 5 Sheets-Sheet 1
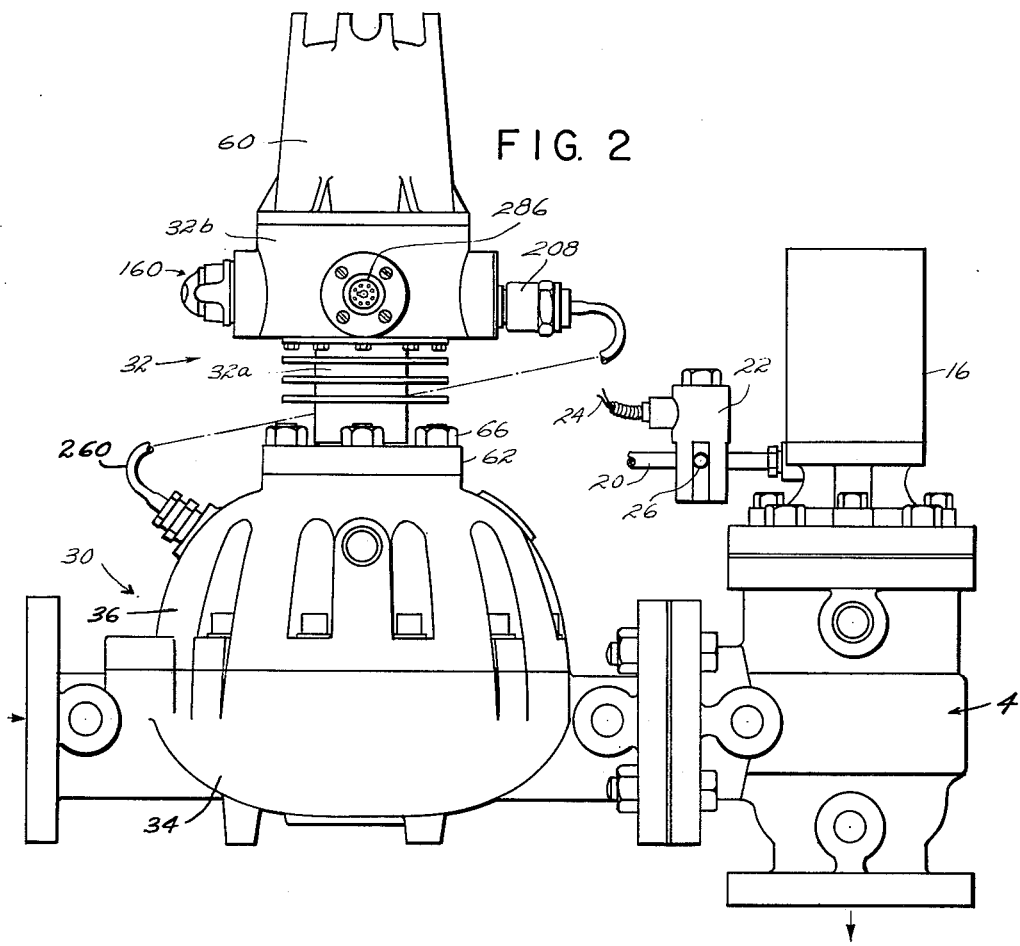
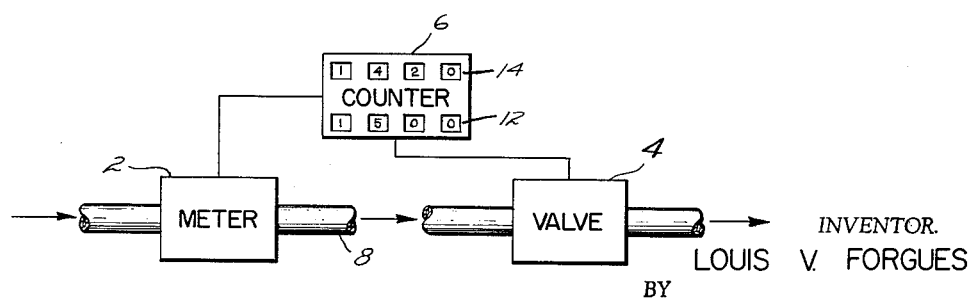
INVENTOR.
LOUIS V. FORGUES
BY
Weingarten, Overbuch & Panhisio
ATTORNEYS.

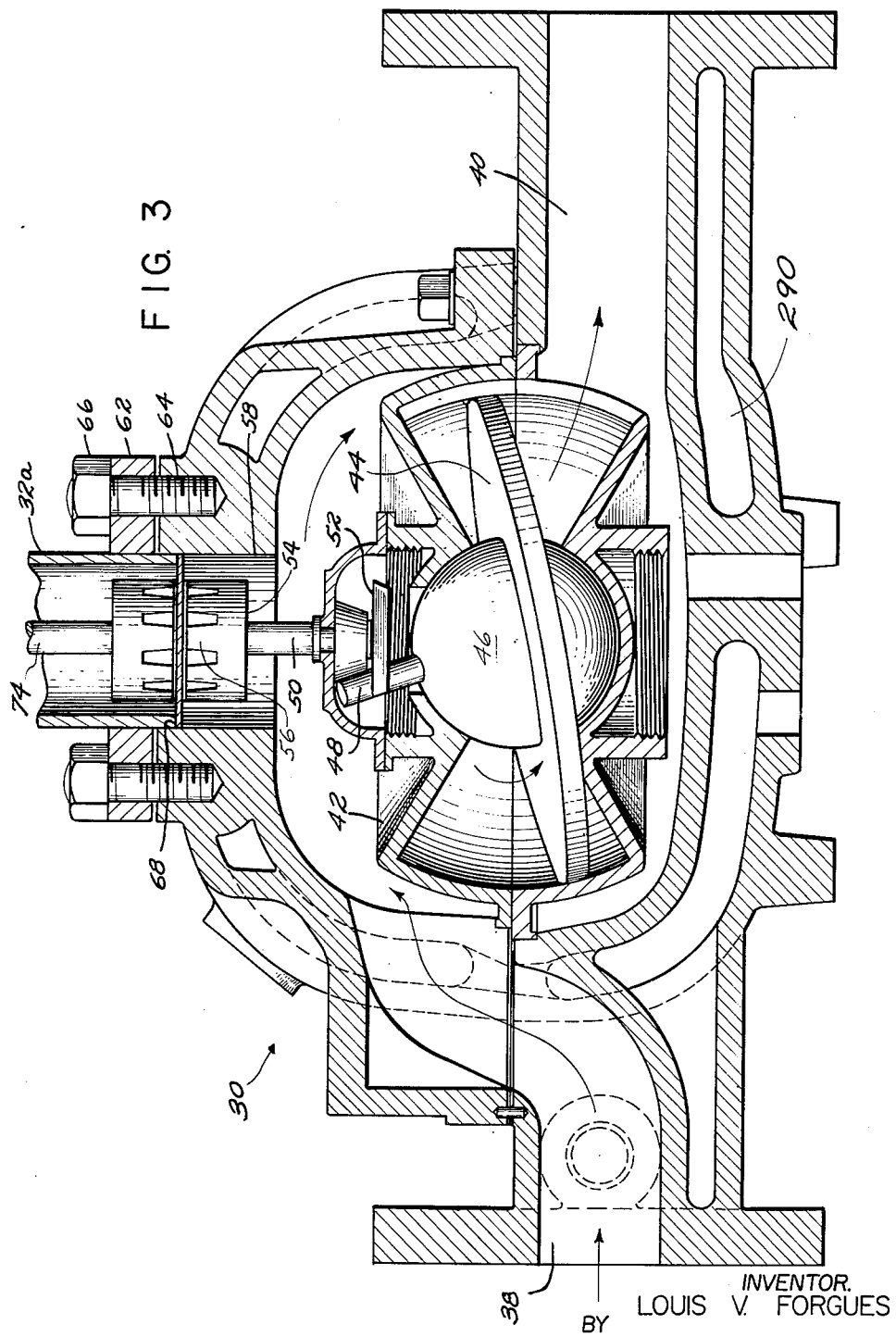

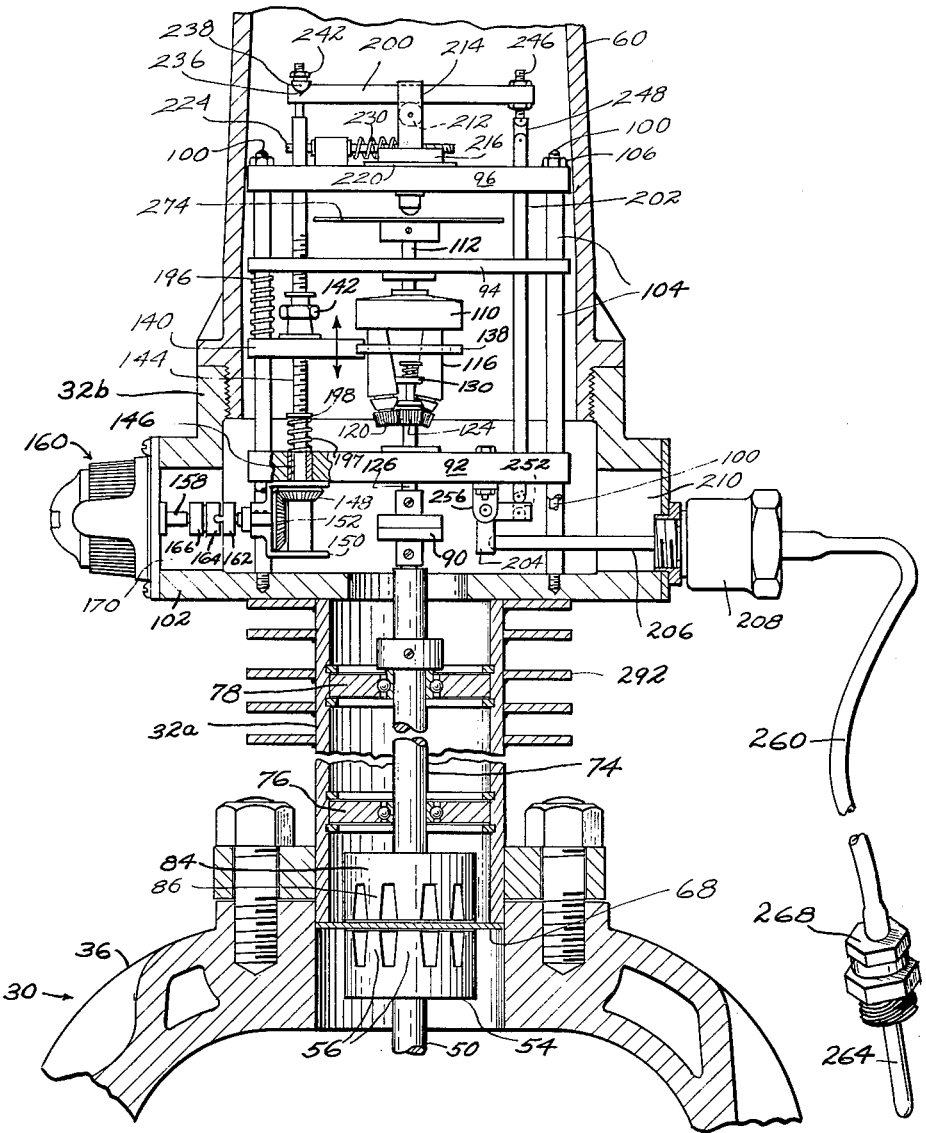

Oct. 26, 1965     L. V. FORGUES     3,213,687
FLUID METER

Filed Oct. 15, 1962     5 Sheets-Sheet 4

INVENTOR.
LOUIS V. FORGUES
BY
*Weingarten, Orenbuch & Pondiscio*
ATTORNEYS

Oct. 26, 1965  L. V. FORGUES  3,213,687
FLUID METER

Filed Oct. 15, 1962  5 Sheets-Sheet 5

INVENTOR.
LOUIS V. FORGUES
BY
Weingarten, Crankuch & Pandiscio

ATTORNEYS

United States Patent Office 3,213,687
Patented Oct. 26, 1965

3,213,687
FLUID METER
Louis V. Forgues, Lunenberg, Mass., assignor to
Parks-Cramer Company, Fitchburg, Mass.
Filed Oct. 15, 1962, Ser. No. 230,585
4 Claims. (Cl. 73—233)

This invention relates to fluid meters and more particularly to a novel batching meter with a remote digital readout.

In various industries, it is necessary to dispense or deliver fluids in accurately weighed quantities automatically with a minimum of handling and mechanical weighing. Moreover, in some installations where fluids are collected in measured batches, it is important for the batching to proceed as fast as possible without loss of accuracy. In such installations, it is desirable to have a high capacity meter with an electronic rather than mechanical register since an electronic register can operate at a much greater rate than a mechanical register. Also required in some cases is the need for a remote readout so that the metering device may be located in a location satisfactory to engineering and plumbing requirements while the controls and indicators may be disposed in a position most convenient and safe for the operator. To meet these needs, various meter constructions have been developed. Two typical systems are shown in U.S. Patents 2,759,633 and 2,713,272.

While the various prior systems have utility, there has still remained the need for an improved batching meter which performs the same functions in a better way while overcoming certain limitations and disadvantages attendant to the prior systems. Prior art systems have suffered from one or more of the following limitations and disadvantages: (1) unreliability, (2) low-speed operation, (3) inaccuracy due to poor volume or weight resolution, (4) unsuitability for explosive or toxic fluids, exterior use, or high pressures because of lack of leakproof construction, (5) high cost, (6) complexity, (7) lack of convenient, easy-to-operate, manual adjustment for calibration of meter according to product density, (8) limited range of meter calibration, (9) lack of automatic compensation for variations in product density due to temperature changes, (10) inability to handle a wide variety of fluids without factory adjustment of meter, and (11) parallax errors in reading pointer-type indicators.

Accordingly, the primary object of the present invention is to provide a batching meter which overcomes the above-described limitations and disadvantages of the prior art.

A more specific object of the invention is to provide a batching meter having a high resolution on a weight or volume basis and adapted to be used with a remote high-speed digital readout whereby measuring speed is limited only by the rate at which fluids can be pumped to the meter.

Another specific object of the present invention is to provide a batching meter having a metering head which is positively sealed off from the product-wetted metering chamber, whereby there is eliminated any possibility of explosive, corrosive, or toxic fluids entering the meter head to cause deterioration or damage or escape to the atmosphere.

Still another specific object of the present invention is to provide a batching meter which can be calibrated manually and has means for correcting for variations in product density due to fluctuations in product temperature.

Another important object of the present invention is to provide a liquid batching meter which can be calibrated without disassembly thereof and which has an incremental counter with a display of batch quantity in digital form, whereby reading errors due to parallax are avoided.

A further object of the present invention is to provide a batching meter having a meter head adapted to produce pulses for a pulse counter at a rate dependent upon the rate of flow of product through the meter, the meter head also having means for varying the pulse rate independently of the rate of product flow whereby the meter can be recalibrated to greater or less accuracy in terms of the number of pulses per unit part of metered fluid.

In a preferred embodiment, the invention comprises a flow-through housing a product-wetted measuring chamber disposed between inlet and outlet ports and containing a product-driven piston or impeller operative to rotate an output shaft at a speed proportional to the rate of product flow through the meter. Attached to the flow-through housing is a second housing containing a meter head. The latter has an input shaft driven from the output shaft of the flow-through housing through a magnetic coupling which permits the meter head housing to be hermetically sealed off from the flow-through housing by a solid metal diaphragm. The meter head includes a variable speed drive which rotates a multi-slotted disc at a speed proportional to the speed of the output shaft of the flow-through housing. Also embodied in the meter head is a light source providing a narrow light beam aimed at a photocell unit. The light source and photocell unit are located on opposite sides of the perforated disc so that the disc blocks off light except when one of its holes is aligned with the light beam. The photocell produces an output pulse each time that it receives the light beam. The output from the photocell is coupled to a remote electronic pulse counter of conventional design having a digital readout of the number of pulses counted and adapted to produce an output pulse when a predetermined count is reached. This output pulse may be used to terminate fluid flow through the meter or to divert fluid from the meter to another destination. The meter head also includes a manual control for adjusting the variable speed drive so as to vary the speed ratio between the output shaft of the flow-through housing and the perforated disc. The manual control includes a digital readout dial which facilitates recalibration of the meter. Also embodied in the meter head is an automatic temperature compensating device which changes the setting of the variable speed drive according to changes in product temperature. The temperature compensator includes a linkage for the variable speed drive that is actuated by a bellows which expands or contracts according to the temperature of the metered product as sensed by a probe extending into the flow-through housing or the line into which it is connected.

Specific details of construction and other objects and advantages of the present invention are set forth in or will be apparent from the following detailed specification which is to be read in conjunction with the accompanying drawings wherein:

FIG. 1 is a block diagram of a typical system embodying the present invention;

FIG. 2 is a view in side elevation of a batch metering apparatus embodying the present invention;

FIG. 3 is an enlarged sectional view of the bottom portion of the batch meter shown in FIG. 2, illustrating the internal construction of the flow-through meter housing and the magnetic coupling between the flow-through meter housing and the meter head;

FIG. 4 is a vertical sectional view showing the internal construction of the meter head;

FIG. 5 is a fragmentary plan view of the apparatus shown in FIG. 4;

Figure 6:
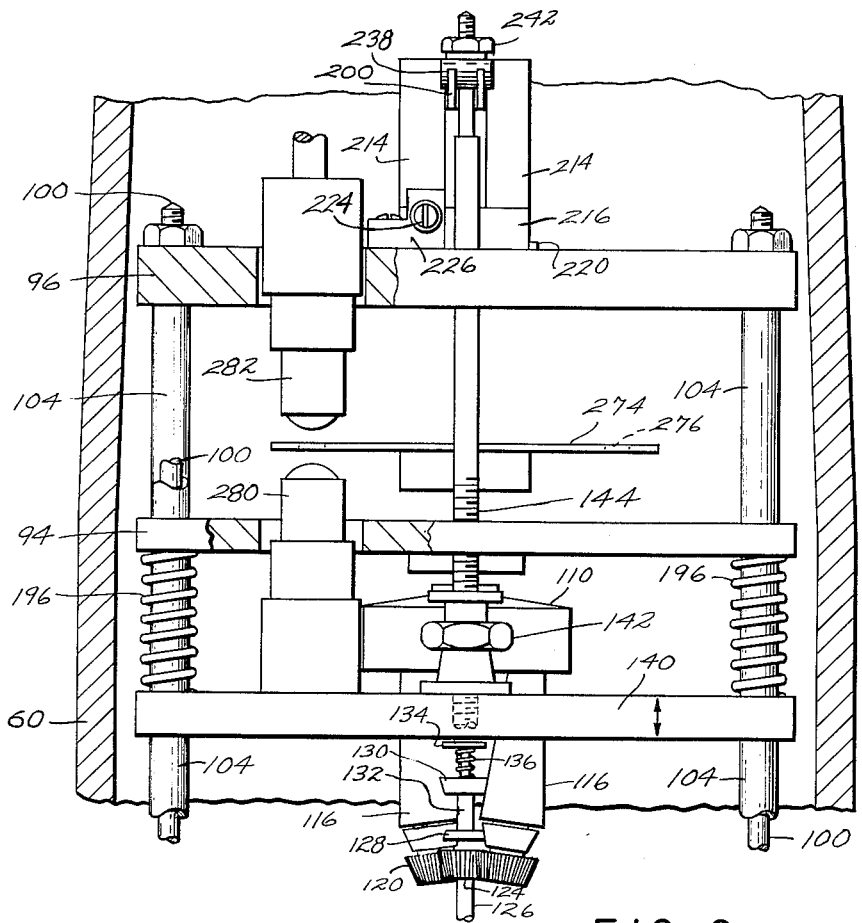
FIG. 6 is an enlarged vertical section of the meter head looking from left to right in FIG. 4.

Referring now to FIGS. 1 and 2, a batching system embodying the present invention will comprise three units—a batching meter 2, a quick-closing electrically actuated valve 4 which controls the flow of fluid passed by the meter 2, and a counter 6. The meter and valve are connected in a product pipe line 8. The counter is remote from the line but is coupled electrically between the meter and valve. The counter counts pulses generated by the meter and generates an output pulse to actuate the valve when the pulses received from the meter reach a predetermined selected total. Since the counter may be constructed according to several conventional designs and counters suitable for this invention are standard items of commerce, it has been deemed unnecessary to show a particular counter in detail. However, the counter should be able to provide a digital presentation of the number of pulses required to generate an output pulse as well as the number of pulses actually received up to any given instant, as shown at 12 and 14 respectively. It is also preferred that the counter reset itself automatically after the predetermined count is reached and have provision for restarting it manually and also automatically after resetting. The latter is required where the valve 4 is replaced by a diverting valve having two instead of one exit port.

Preferably, valve 4 is of the type which is cocked pneumatically and closes quickly under the influence of a strong compression spring when the air pressure is suddenly relieved. Thus, the valve shown in FIG. 2 includes a standard pneumatic actuator 16 having a spring-biased piston shaft (not shown) on which is mounted the movable valve member (not shown) of the valve. Air is supplied to the actuator from a supply line 20 via a solenoid air valve 22. The latter is coupled by leads 24 to the counter 6 which keeps the solenoid of valve 22 energized until a predetermined count is reached, at which point the solenoid will be deenergized. When this occurs, the valve 22 will disconnect actuator 16 from supply line 20 and connect it to a vent port 26, whereupon the valve 4 will close quickly. When the counter is reset, valve 22 will cause actuator 16 to reopen valve 4 so that fluid product may again be discharged from its exit port as shown by the arrow in FIG. 2.

Referring now to FIGS. 2 and 3, the meter comprises a conventional flow-through housing 30 supporting a second meter head housing 32. The flow-through housing is formed in two sections 34 and 36 and has inlet and outlet ports 38 and 40 provided with flanges whereby it may be connected in a fluid system. Formed within the flow-through housing is a flow-through measuring chamber 42 with a measuring piston 44 which includes a ball portion 46 having a radially projecting arm 48 which is coupled to an output shaft 50 by a member 52. Shaft 50 is rotatably supported in the top wall of the measuring chamber. As product flows through the measuring chamber, the piston is caused to rotate to displace a fixed volume of liquid at each cycle. The output shaft rotates at the same speed as the piston, which speed is determined by the rate of flow of product through the measuring chamber. It is to be appreciated that the flow-through meter housing and its operating parts are conventional, and, therefore, to the extent just described, the flow-through section of the batching meter may be replaced by other well-known types of flow-through metering units.

Mounted on the output shaft 50 is a permanent magnet 54 made of Alnico alloy. The latter is in the form of a cylindrical member having an end wall to which shaft 50 is locked. At the other end, the magnet is slotted as shown to provide a plurality of poles 56. The magnet fits within but does not project through a large opening 58 formed in the upper wall of the housing section 36. Magnet 54 coacts with a second magnet in the meter head housing 32, as hereinafter described.

Referring now to FIGS. 2, 3, and 4, the meter head housing 32 comprises a bottom hollow section 32a and a top hollow section 32b. The latter is provided with an elongated screw cover 60. The bottom end section 32a has a flange 62 at its bottom end provided with holes to receive studs 64 anchored in the top wall of housing 30. Nuts 66 screwed onto studs 64 serve to secure the meter head housing 32 to the housing 30. The meter head housing has a stainless steel diaphragm 68 welded to its bottom end so as to hermetically seal off its interior. The sealed-off bottom end section 32a of the meter housing projects within the opening 58 formed in the upper wall of the meter casing so that the diaphragm 68 will be in close spaced relation to the magnet 54. Although not shown, it is understood that a gasket may be disposed between the top wall of the flow-through housing 30 and the flange 62 of the meter head. With the meter head housing 32 thus attached to the meter housing 30, it is believed to be apparent that whatever product flows through the housing 30 will be completely isolated from the interior of the housing 32. Accordingly, explosive and combustible fluids may be metered without danger of explosion or combustion being triggered by exposure to electric currents or potentials existent in the meter head.

As seen in FIGS. 3 and 4, an input shaft 74 for the meter head is rotatably supported within the bottom section 32a by two ball-bearing units 76 and 78. Attached to the bottom end of shaft 74 is a permanent magnet 84. The latter is identical to the magnet 54 mounted on shaft 50 except that its poles 86 are of opposite polarity from the poles 56 so that the two magnetic fields reinforce each other. As a result, the input shaft 74 is coupled to the output shaft 50 by a relatively large magnetic force clutching together the two permanent magnets. The plurality of poles on the two magnets act to channel the flux of the mutually reinforcing magnetic fields so that the net effect is analagous to a plurality of directly connected tie rods cooperating to prevent one magnet from rotating relative to the other. Hence, shafts 50 and 74 will turn together in a 1:1 ratio without slippage.

Shaft 74 extends up into the upper section 32b of housing 32, and its upper end is connected by a flexible coupling 90 to a metering head mechanism now to be described. The metering head mechanism comprises a framework consisting of three circular plates 92, 94, and 96 disposed one above the other and tied together by four tie rods 100 each secured to the bottom wall 102 of the upper section 32a of the meter head housing. The plates are held apart by spacer sleeves 104 mounted on each tie rod 100, with the topmost plate 96 held in place by nuts 106 screwed onto the ends of the rods.

Supported between plates 92 and 94 is a variable speed drive of the type commonly known as a "Graham Drive," manufactured by Graham Transmissions, Inc., of Menomonee Falls, Wisconsin. The drive shown in FIG. 4 comprises a circular bearing-carrier 110 attached to a stub shaft 112 rotatably supported by a bearing mounted in plate 94.

Three identical, equally spaced cones 116 (only two are visible) have their small ends rotatably anchored by bearings in the bearing-carrier 110. Each cone has a major and a minor conical surface in base-to-base relation as shown. The cones are supported by bearing-carrier 110 at a downwardly converging angle so that from one end to the other their major conical surfaces are tangent to a common imaginary surrounding cylinder. Affixed to reduced diameter extensions on the larger ends of cones 116 are like bevel gears 120 which mesh with a fourth bevel gear 124 mounted on the end of another stub shaft 126 which is rotatably supported by a bearing mounted in plate 92 and is connected at its opposite end to the flexible coupling 90. As seen best in FIG. 6, floating freely at the center of the array of cones in line with shaft 126 is a unit comprising two discs 128 and 130 with beveled edges engaging the minor and major conical surfaces respectively of the cones. Affixed to disc 128 is a rod 132 on which disc 130 is slidably mounted. Attached to the end of rod 132 is a rivet with an enlarged head 134. A compression spring 136 disposed between disc 130 and rivet head 134 urges disc 130 toward disc 128. This causes discs 128 and 130 to force cones 116 tight against the inner edge of a control ring 138 which encircles the three cones. Due to the angle at which the cones are disposed, when the control ring 138 is moved in a straight line toward and away from bearing-carrier 110, its inner edge will remain in contact with the three cones.

When shaft 126 is turned by shaft 74, gear 124 will drive gears 120. Due to the friction between the cones and ring 138, rotation of gears 120 will cause the cones to "walk" around the ring, thereby causing bearing-carrier 110 and shaft 112 to rotate at a speed proportional to the speed of shaft 124. The exact speed ratio between shafts 112 and 126 is determined by the position of ring 138. When the latter is moved upward toward the smaller ends of the major conical surfaces of the cones, shaft 112 will rotate slower; conversely, when it is moved downward, shaft 112 will rotate faster. Means (not shown) are provided to lubricate the various drive elements.

The control ring 138 is attached to an arcuate plate 140 which is provided with an internally threaded bushing 142 that is mounted on a threaded rod 144 which is slidably supported in plates 92, 94, and 96 and is slidably keyed as shown at 146 to the hub of a bevel gear 148 rotatably supported by a U-shaped bracket 150 attached to plate 92. Also rotatably supported by bracket 150 is the hub of a second bevel gear 152 which meshes with gear 148. Gear 152 is attached to a stub shaft which is coupled to the output shaft 158 of a manual calibration control unit identified generally at 160 by means of an Oldham-type flexible coupling comprising three discs 162, 164, and 166 which are separably coupled by bar and slot connections. In this connection, it is to be noted that a radial port 170 is provided in the upper section of the meter head housing to accommodate the output shaft of the manual calibration control unit 160 and the Oldham-type flexible coupling. The latter automatically comes apart when the control unit is removed, the disc 162 remaining attached to the bevel gear 152 while the disc 164 remains attached to the control unit.

Figure 8:
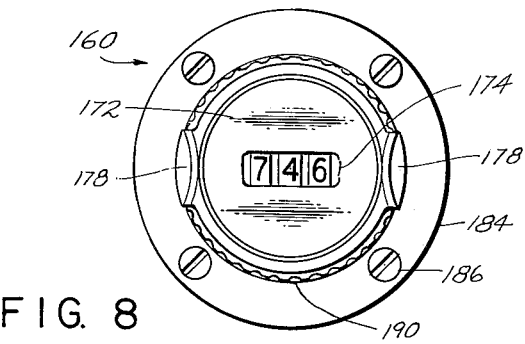
FIG. 8 is an end view of the manual control unit for calibrating the meter head.
Figure 9:
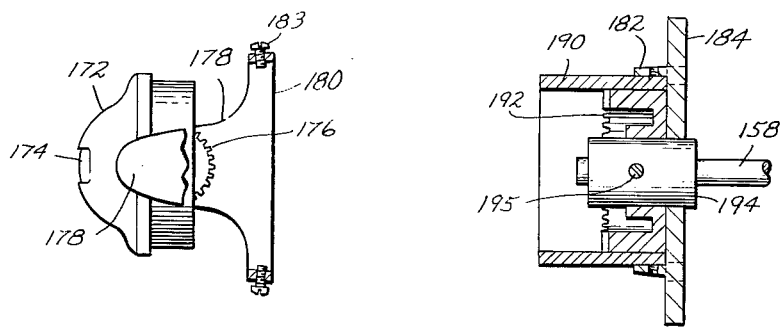
FIG. 9 is an exploded side view, partly in section, of the manual calibration control unit.

As seen in FIGS. 4, 8, and 9, the manual calibration control unit 160 comprises a housing 172 having a rounded face provided with a window 174. Displayed in window 174 are numbers on a standard three-wheel Veeder-Root type mechanical decimal counter (not shown) disposed within housing 172. The mechanical counter is operated by a small gear 176. The housing 172 is attached to two side arms 178 which in turn are connected to a ring 180. The latter fits onto and is secured by screws 183 to an annular flange 182 formed integral with a plate 184 that attaches to housing 32 by screws 186. Rotatably secured to plate 184 is a knurled sleeve 190 on the inside of which is disposed a ring gear 192 which meshes with gear 176. Secured within the hub of ring gear 192 is a sleeve 194 sized to support the output shaft 158. The latter is secured to sleeve 194 by one or more set screws 195. When sleeve 190 is rotated, output shaft 158 will turn at the same speed and thereby cause the control rod 144 to rotate to move the control ring 138 up or down, depending on the direction of rotation of sleeve 190. Simultaneously, sleeve 190 will cause ring gear 192 to turn gear 176, whereby the numbers in window 194 will change in a forward or backward direction according to the direction of rotation of sleeve 190.

Preferably, the total displayed in window 174 changes by the sum of one hundred when the sleeve 190 is turned through exactly one revolution.

The threaded rod 144 and the control ring 138 are urged downward by two springs 196 which surround two of the tie rods 100 and are held by plate 94 so as to exert a biasing force on the arcuate plate 140 to which the control ring is attached. The extent to which rod 144 is moved down is determined by a compression spring 197 disposed on rod 144 between a collar 198 and plate 92. An additional stop (not shown) may be employed to prevent ring 138 from being moved down too far on the cones by rotation of rod 144 when the latter is held down by springs 196 to the limit determined by spring 197 and collar 198. Upward movement of ring 138 on the cones by movement of rod 144 is limited by engagement of bushing 142 with plate 94. To the extent described, it is believed to be apparent that ring 138 may be moved (1) by rotation of rod 144 by control unit 160 or (2) by axial movement of rod 144 made possible by its slidable connection with bevel gear 148.

Axial movement of rod 144 is controlled by a linkage comprising two levers 200 and 202, a bell crank 204, and the operating rod 206 of a bellows-type pressure-responsive actuator 208 removably mounted in a second radial port 210 formed in the meter housing. The lever 200 rests on a circular pivot bearing 212 rotatably supported between two vertical arms 214 attached to a block 216 slidably secured on plate 96 by two guides 220. One of the arms 214 has a threaded hole in which is disposed a threaded rod 224. The latter is rotatably supported in a bearing block 226 attached to plate 96 and is captivated against axial movement by snap rings 228. The end of rod 224 is kerfed to accommodate a screwdriver. A spring 230 on rod 224 acts between one of the arms 214 and bearing block 226 to maintain a constant pressure between the parts. The end of lever 200 nearest rod 144 is slotted lengthwise as at 232 to accommodate rod 144 and also is provided with a V-shaped transversely extending groove 236 on its upper surface to receive a semicircular bar 238 movably mounted on the upper end of rod 144. Bar 238 is held onto bar 144 by a nut 242 screwed onto the end of rod 144. The downward thrust on rod 144 exerted by springs 196 keeps bar 238 in groove 236.

Attached to the opposite end of lever 200 is a threaded rod 246 whose bottom end is pivotally connected to a link 248 which in turn is pivotally connected to the upper end of lever 202. The bottom end of lever 202 is pivotally connected to a link 252 which in turn is pivotally connected to crank 204. The latter is pivotally mounted on a bracket 256 attached to plate 92. The bottom arm of crank 204 is formed with a rounded depression to receive the rounded end of actuating rod 206 of actuator 208. The interior of the latter is connected to a mercury-filled pilot tube 260 and probe 264. The probe is inserted somewhere in the product line, preferably in the flow-through meter housing as shown in FIG. 2. The probe is secured in place by a threaded bushing 268.

As indicated previously, the springs 196 bias the arcuate plate 140 downward. In practice, this causes control rod 144 to be held in a position slightly lower than as shown in FIG. 4 when the probe is at room temperature or lower. Consequently (with reference to FIG. 4), the lever 200 normally is positioned with its right end higher than its left end and with the crank 204 occupying a position slightly more counterclockwise. When the probe 264 is contacted or exposed to a fluid product in the pipeline 8, the actuating rod 206 will be extended by the bellows of actuator 208 so as to move the crank clockwise. This in turn will cause control rod 144 to move upward. The extent of movement of rod 144 by actuator 208 will depend upon the temperature of the fluid product sensed by the probe and also by the position of the pivot bearing 212. Shifting the bearing to the right or left by rotation of threaded rod 224 alters the response of control rod 144 to pivotal movement of lever 200.

Figure 7:
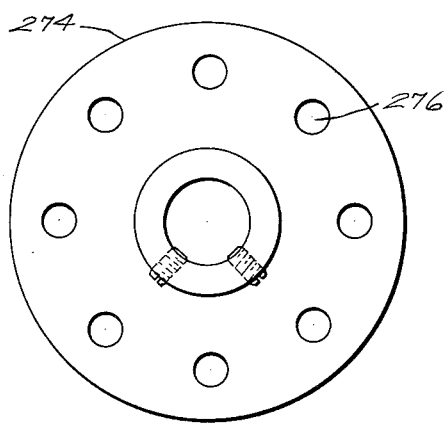
FIG. 7 is a bottom view of the perforated disc which functions as a shutter for the optical signal generating system.

Referring now to FIGS. 4, 6 and 7, removably attached by set screws to the stub shaft 112 (which may be considered as the output shaft of the variable speed drive unit) is an opaque shutter disc 274. As seen in FIG. 7, shutter disc 274 has a plurality of small holes 276 in a circular array concentric to its axis of rotation. The shutter disc is disposed between a photocell 280 and a light source 282 attached by brackets to plates 94 and 96 respectively. The light source is positioned to emit a beam parallel to the axis of rotation of the shutter disc at a point which is at the same radial distance from said axis as the holes 276. Hence, each hole in turn will pass through said beam as the shutter disc rotates. The photocell is positioned to receive each burst of light passed by one of the shutter disc holes. Assuming that the photocell is connected to an appropriate electrical circuit, a signal pulse will be generated by the photocell each time it receives a bundle of light. The repetition rate of the pulses is a function of the speed of rotation of the shutter disc. Thus, the number of pulses generated in a given time interval is an indication of the quantity of fluid product passed by the flow-through meter housing during that same interval. Power is supplied to the light source and the photocell is connected to the counter by way of a standard electrical plug 286 disposed in a suitable port in the meter head housing at right angles to the manual calibration control 160 and the bellows-type actuator 208.

Batching a fluid product with the illustrated apparatus is conducted as follows. First of all, the manual calibration control unit is operated to set the variable speed drive at a speed ratio at which the meter head will produce a known number of pulses per unit quantity of material passed by the flow-through housing. Then the counter is set for a total pulse count which, at the known pulse-per-unit quantity rate, will cause the valve 4 to close after a predetermined quantity of fluid product has been passed by the meter. Thereafter the counter is reset to zero for the next cycle of operation. The system can be adapted to cause valve 4 to reopen automatically when the counter is reset to zero or to maintain valve 4 closed after the counter has been reset until a control signal for actuating valve 22 is provided by manually or automatically operated means embodied in the counter or in a separate control unit.

In practice, operation of the illustrated apparatus is facilitated by a calibration chart which identifies each fluid product to be handled and lists for each such product different rates of pulses per unit quantity of product and the different settings of the manual calibration control unit 160 (in terms of the numbers displayed in its window) which will yield the different rates of pulses per unit quantity of product. The unit quantity reflected by the calibration chart may be in terms of weight, e.g., one pound, or in terms of volume, e.g., one-tenth of a gallon. Preferably, for a given fluid product, the calibration chart will list a plurality of pulse rates which differ by multiples of a convenient number such as 2 e.g., one pulse per pound, two pulses per pound, and four pulses per pound. Thus, if the operator should find that a pulse rate of two pulses per pound is unnecessarily precise and that a coarser calibration is tolerable, he may adjust the control unit 160 so as to get a pulse rate of one pulse per pound. On the other hand, if a finer calibration is required, he can rapidly adjust for a pulse rate of four pulses per pound. Of course, changing from one calibration range to another range requires a corresponding adjustment in the setting of the counter if the batching quantity is to remain unchanged.

Any changes in density of the fluid product due to changes in temperature which occur while the system is in operation are compensated for by the linkage operated by the actuator 208. The extent to which the density of a particular product will change over a known temperature range determines the setting of the pivot of lever 200 which will cause the control rod 144 to change the speed ratio of the variable drive system to the extent necessary to properly correct the rate at which pulses are generated for each unit quantity of fluid product.

It is believed to be apparent from the foregoing specification that the present invention has many advantages. One outstanding advantage is that the meter may be used to handle extremely hot fluids without damage to the meter head components since the flow-through housing 30 may have a jacketed construction, as evident at 290 in FIG. 3. Moreover, any transfer of heat from the flow-through housing to the meter head housing is dissipated rapidly by virtue of the fins 292 (FIG. 4) provided on the outside of the meter head housing.

The manual calibration control 160 permits upward or downward adjustment of the pulse rate output according to the density of the fluid product at a given temperature, such adjustment not only being precise but performable without disassembling the meter head or its connections to the counter. The automatic temperature responsive means for varying the setting of the variable drive mechanism according to temperature-induced changes in product density is particularly advantageous since its response can be adjusted by shifting the position of the pivot bearing 212 for the lever 200.

Perhaps the most important advantage resides in the fact that the meter head is sealed off from the flow-through housing 30 by the diaphragm 68. This construction eliminates a stuffing box for shaft 50. As is well known, stuffing boxes are expensive to maintain, particularly when handling hot or corrosive fluids, and are a troublesome source of leaks. Moreover, a stuffing box creates a drag on the output shaft so that a gear train is required in the flow-through housing to apply sufficient turning torque to the shaft. The hermetic seal afforded by the diaphragm 68 eliminates any danger of leakage of inflammable or explosive fluid product from the flow-through housing 30 into the meter head housing 32 where electrical potentials exist because of the electrical connections to the light source and the photocell associated therewith. It also means that personnel need not worry about leakage of toxic fluids. The leakproof connection between the two housings further permits the meter head housing 32 and its components to be made of materials which are most suitable from the standpoint of cost, ease of fabrication, ruggedness and reliability without any concern for corrosion from exposure to the fluid product in the flow-through housing 30. On the other hand, the flow-through housing 30 and its associated components can be made of high-quality materials such as stainless steel or other alloys which are best adapted to handle corrosive and explosive fluids.

A particular point is to be noted with respect to applicant's variable speed, Graham-type drive. Heretofore such a drive has not been deemed suitable for use in a batching meter since its output torque is relatively small and the torque required to drive the gear trains of the rugged, large size, mechanical counters found in the registers of conventional batching meters is relatively large. However, a Graham-type drive is feasible in applicant's apparatus since the amount of torque required to turn the shutter 274 is very small in relation to that required to operate a mechanical-type register. In fact, because of the low-torque characteristics of applicant's meter head mechanism, the invention is suitable for gas as well as liquid metering, the flow-through housing must include a suitable gas-driven mechanism in place of the piston unit shown in FIG. 3. Applicant's variable speed drive also permits greater accuracy than is possible with one having an involved gear train since the latter introduces errors due to backlash.

Another advantage of the invention resides in the physical arrangement of the meter head. Removal of the screw cover 60 exposes most of the working parts of the meter head. This ready access permits maintenance costs as well as troubleshooting time to be kept within reasonable bounds.

A further advantage of the meter head is that it may be used together with various types of electronic pulse counters, particularly those having some form of digital display of pulse count so as to eliminate setting and reading errors due to parallax. Further convenience to the operator is afforded by the numeric display in the window 174 of the manual calibration control 160. The numbers shown in the window are easy to read so as to facilitate quick and accurate adjustment of the setting of the variable speed drive according to the density of the product to be handled.

It is to be appreciated also that the invention is not limited to a batching system as shown but may be used in other types of systems as well. Since the invention has an accuracy substantially independent of variations in rate of flow of fluid product and can meter fluids moving at low speeds or high speeds, it may be embodied in a continuous flow system where it is desired simply to provide a count representative of a running total of the amount of fluid transported in the system from a known starting time. It also is contemplated that the output pulses from the meter head may be fed to a pulse rate integrator having an output indicator calibrated to show the rate of flow in terms of weight or volume per minute or other time unit.

Obviously, many other modifications and variations of the present invention are possible in the light of the foregoing teachings. It is to be understood, therefore, that the invention is not limited in its application to the details of construction and arrangement of parts specifically described or illustrated, and that within the scope of the appended claims, it may be practiced otherwise than as specifically described or illustrated.

I claim:

1. A meter comprising a first housing having an inlet port and an outlet port, a displacement piston having a cycle of movement wherein a fixed volume of liquid is displaced during one complete cycle, a first output shaft operatively coupled to said piston so as to make one complete revolution for each complete cycle of movement of said measuring piston, a second housing attached to said first housing and having a removable cover, the interiors of said first and second housings hermetically sealed off one from the other by a non-magnetic diaphragm attached to one of said two housings, an input shaft rotatably mounted within said second housing, permanent magnets mounted on said output and input shafts in close proximity to said diaphragm, said magnets adapted to couple together said first output shaft and said input shaft whereby said input shaft will rotate with said first output shaft, a variable speed drive mechanism mounted within said second housing and connected for operation by said input shaft, a second output shaft coupled to said variable speed drive mechanism for rotation thereby at a speed proportional to the speed of said input shaft, said variable speed drive mechanism comprising three conical drive elements adapted to be rotated by said input shaft, means mounting said conical elements for orbital movement about the axis of rotation of said input shaft, and a control ring surrounding and engaged by said conical elements, the position of said control ring along said conical elements determining the speed of said second output shaft, a disc mounted on said second output shaft, said disc having a plurality of holes uniformly spaced from its axis of rotation, a light source mounted within said second housing and producing a beam directed at a point in the path of movement of said holes, a photocell positioned to receive light passing through said holes from said source, said photocell adapted to produce an output signal each time it receives light from said light source, whereby when said first output shaft is rotated a train of pulses will be produced having a repetition rate varying as a function of the speed of rotation of said first output shaft.

2. A meter as defined by claim 1 further including means accessible on the exterior of said second housing for manually adjusting the position of said control ring.

3. A meter as defined by claim 1 further including means for adjusting the position of said control ring in accordance with changes in temperature of liquid flowing through said first housing.

4. A meter comprising a first housing having inlet and outlet ports and a metering mechanism with an output shaft which is rotated at a speed proportional to the rate at which a fluid product is flowing through said first housing via said ports, a second housing attached to said first housing and having a removable cover, the interiors of said first and second housings hermetically sealed off one from the other by a non-magnetic diaphragm attached to one of said two housings, an input shaft rotatably mounted within said second housing, permanent magnets mounted on said output and input shafts in close proximity to said diaphragm, said magnets adapted to couple together said first output shaft and said input shaft whereby said input shaft will rotate with said first output shaft, a variable speed drive mechanism mounted within said second housing and connected for operation by said input shaft, a second output shaft coupled to said variable speed drive mechanism for rotation thereby at a speed proportional to the speed of said input shaft, said variable speed drive mechanism comprising three conical drive elements adapted to be rotated by said input shaft, means mounting said conical elements for orbital movement about the axis of rotation of said input shaft, and a control ring surrounding and engaged by said conical elements, the position of said control ring along said conical elements determining the speed of said second output shaft, a disc mounted on said second output shaft, said disc having a plurality of holes uniformly spaced from its axis of rotation, a light source mounted within said second housing and producing a beam directed at a point in the path of movement of said holes, a photocell positioned to receive light passing through said holes from said source, said photocell adapted to produce an output signal each time it receives light from said light source, whereby when said first output shaft is rotated a train of pulses will be produced having a repetition rate varying as a function of the speed of rotation of said first output shaft.

References Cited by the Examiner

UNITED STATES PATENTS

| | | | |
|---|---|---|---|
| 2,208,687 | 7/40 | Renfrew | 73—233 |
| 2,403,627 | 7/46 | Bade | 74—796 |
| 2,623,389 | 12/52 | Van Oosterom | 250—233 X |
| 2,693,991 | 11/54 | Holtz | 250—233 X |
| 2,706,916 | 4/55 | Graham | 74—796 |
| 2,862,162 | 11/58 | Baring | 73—205 X |
| 2,942,497 | 6/60 | Berck | 73—233 X |
| 2,962,895 | 12/60 | Rumble | 73—231 X |
| 3,035,442 | 5/62 | Dunn | 73—258 |
| 3,053,082 | 9/62 | Loud et al. | 73—233 X |
| 3,073,157 | 1/63 | Gehre | 73—233 X |
| 3,088,317 | 5/63 | Steen | 73—233 |

RICHARD C. QUEISSER, *Primary Examiner.*